United States Patent [19]
McCallion

[11] Patent Number: 5,154,558
[45] Date of Patent: Oct. 13, 1992

[54] BLIND ANCHOR FOR USE WITH UNTHREADED ROD

[76] Inventor: James P. McCallion, 23352 St. Elena, Mission Viejo, Calif. 92691

[21] Appl. No.: 817,065

[22] Filed: Jan. 6, 1992

Related U.S. Application Data

[63] Continuation of Ser. No. 577,926, Sep. 4, 1990, abandoned.

[51] Int. Cl.$^5$ .................... F16B 13/06; F16B 7/10
[52] U.S. Cl. .................... 411/54; 411/57; 403/371
[58] Field of Search .................... 411/54, 24, 25, 32, 411/33, 44, 45, 57, 63, 64, 65, 60, 75, 354, 79, 80; 403/371, 374, 240, 263, 369

[56] References Cited

U.S. PATENT DOCUMENTS

| | | | |
|---|---|---|---|
| 561,758 | 6/1896 | Brewer | 411/65 |
| 726,070 | 4/1903 | Keen | 411/60 X |
| 877,118 | 1/1908 | Peirce | 411/34 |
| 2,158,302 | 5/1939 | Peirce | 411/32 |
| 2,177,364 | 10/1939 | Fotsch | 403/371 X |
| 2,896,496 | 7/1959 | Jansen | 411/347 |
| 3,139,730 | 7/1964 | Williams et al. | 411/60 X |
| 3,156,418 | 11/1964 | Jablonski et al. | 403/371 X |
| 3,361,460 | 1/1968 | Jansen | 403/369 |
| 3,399,434 | 9/1968 | Kelly | 52/704 X |
| 3,501,183 | 3/1970 | Stratienko | 403/371 X |
| 3,912,406 | 10/1975 | McGrath | 403/19 |
| 4,006,878 | 2/1977 | Dawson et al. | 249/43 |
| 4,602,902 | 7/1986 | Herb | 411/65 X |
| 4,615,640 | 10/1986 | Hosokawa | 403/369 |

FOREIGN PATENT DOCUMENTS 682163 2/1965 Italy .................... 411/65

Primary Examiner—Rodney M. Lindsey
Attorney, Agent, or Firm—Price, Gess & Ubell

[57] ABSTRACT

A blind anchor capable of anchoring a smooth rod in a hole drilled in an existing structure. The blind anchor consists of a cylindrical expansion sleeve having a cylindrically tapered aperture and a jaw cluster that fits within the expansion sleeve. The expansion sleeve may be slotted to facilitate expansion and may include external ribs to firmly grip the interior of the hole. The jaw cluster is fashioned from a plurality of jaw members that are expandably retained together in a notched retaining ring. The connections between the blind anchor, the smooth rod, and the hole are beneficially reinforced when the rod experiences a pulling force away from the hole.

6 Claims, 3 Drawing Sheets

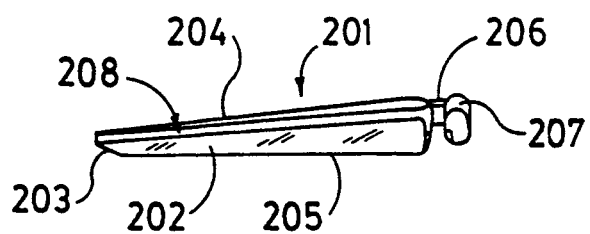
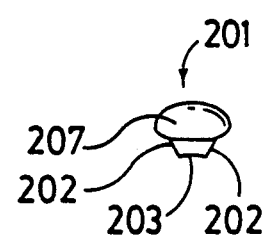
FIG. 3A  FIG. 3C
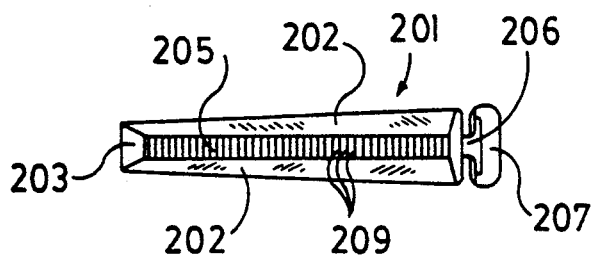
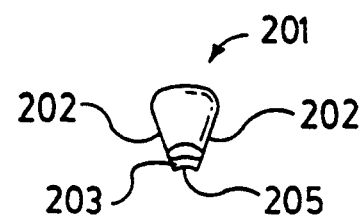
FIG. 3B  FIG. 3D
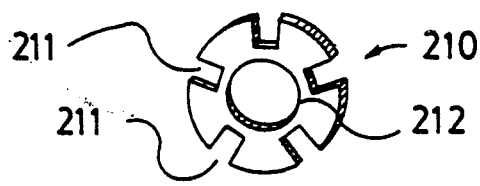
FIG. 4
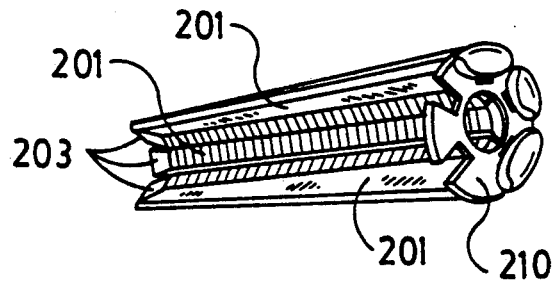
FIG. 5

BLIND ANCHOR FOR USE WITH UNTHREADED ROD

This is a continuation of application Ser. No. 577,926, filed on Sep. 4, 1990, for the Blind Anchor for Use With Unthreaded Rod now abandoned.

BACKGROUND OF THE INVENTION

1. Field of the Invention

The present invention relates generally to fasteners and, more particularly, to a new expansion fastener for anchoring an unthreaded rod in a hole provided on the face of an existing rock or concrete structure.

2. Description of the Prior Art

Fasteners that connect an external member to an existing structure are sometimes called "blind fasteners" because they are "blindly" installed on the face of the existing structure without being accessible from the other side. The present invention is directed towards a type of blind fastener that is typically used to construct a concrete form adjacent to an existing structure or to place reinforcement bar ("re-bar") in an existing structure.

Concrete forms usually include form ties that extend between the walls of the form. The form ties prevent the walls of the concrete form from spreading under the outward forces present during the placement of wet concrete. When constructing an ordinary "free-standing" concrete form that includes two spaced form walls, it is relatively easy to install the form ties because they extend through and are accessible on either side of the concrete form.

It is much more difficult to construct a concrete form adjacent to an existing concrete, masonry, rock, or other structure. In this circumstance, the concrete form consists of the existing structure and a single adjacent form wall. The form ties must somehow be "blindly" connected to and extend from the existing structure. Hence, the need for a simple, cost effective, and easily installed blind fastener.

Blind fasteners are also used for the placement of concrete reinforcement in an existing structure. In this instance, the blind fastener is placed in an existing structure in order to support deformed concrete reinforcement bar ("re-bar").

FIGS. 7 through 9 depict several known fasteners. One prior art blind fastener is called a drop-in anchor (see FIG. 6). A drop-in anchor is comprised of an expansion sleeve 51 that has an aperture 52 with internal threads 53 on one end. The diameter of the aperture 51 is constant for the length of the threads but then tapers gradually towards the other end from where the threads 53 stop. A conical plug 54 is located in the threaded aperture 52 at the start of the taper. A drop-in anchor 50 is installed by first drilling a proper sized hole 56 in the existing structure, by "dropping" the expansion sleeve 51 in the hole 56, and by then expanding the sleeve 51 by driving the conical plug 54 further into the tapering portion of the aperture 52 with an appropriate tool. The installation is completed by turning a threaded rod 57 into the threads 53 of the sleeve.

FIG. 7 shows a different kind of drop-in anchor 60 where a conical plug 64 extends into a rear portion 68 of the sleeve 61. The anchor 60 is installed by dropping the sleeve 61 and the conical plug 64 into a hole 66 drilled in the existing structure and by then punching the sleeve 61 down onto the conical plug 64. The sleeve 61 expands when the plug is driven 64 into the sleeve 61. As before, a threaded rod 67 must then be threaded into the sleeve 61.

An improvement over the drop-in anchors 50, 60 is provided by a type of blind fastener referred to here as a "cone/sleeve" anchor 70 (see FIG. 8). Cone/sleeve anchors, like drop-in anchors, must also use continuous coil rods or rods with threaded ends. The cone/sleeve anchor 70 is comprised of a threaded cone 74, an expansion sleeve 71, and a thrust ring 79. The cone/sleeve anchor is installed by first locking the thrust ring 79 onto the threaded rod 77 (method not shown). Next, the expansion sleeve 71 is slipped onto the rod 77 until it rests against the thrust ring 79 and is prevented from sliding further up the rod. Finally, the threaded cone 74 is turned onto the threaded end 78 of the rod and so that its narrow end wedges into the expansion sleeve 71. The entire assembly is then inserted into a hole 76 drilled in the existing structure and the threaded rod 77 is turned so that the cone 74 is tightened into the expansion sleeve 71 which then expands and seats in the hole 76.

The cone/sleeve anchor 70 is desirable over either of the drop-in anchors 50, 60 because pulling forces from the rod tend to reinforce the connection by pulling the cone 74 further into the sleeve 71. However, as with the drop-in anchors 50, 60, the cone/sleeve anchor 70 requires a threaded rod, making it time consuming to install and difficult to extract after placement of the concrete.

Another prior art fastener is sold under the trade name "Rock Anchor" 80 (see FIG. 9). The Rock Anchor includes an expansion shell 81 that is comprised of two cylindrical halves 81a, 81b that are held adjacent to one another with a U-shaped "back stop" member 87. The adjacent edges of the two cylindrical halves 81a, 81b are angled to define a wedge-shaped gap 82 that opens towards the back stop 87. A wedge member 84 is loosely supported by the back stop 87 and oriented so that the narrow side of the wedge member 84 is directed into the wedge-shaped gap 82 between the two cylindrical halves 81a, 81b. The wedge member 84 contains a threaded aperture 84a for engagement with a threaded rod 87 inserted through the expansion shell 81. The Rock Anchor 80 is placed in a hole 86 and when the threaded rod 87 is tightened, the wedge member 84 is pulled into the gap 82, the two halves 81a, 81b expands, and the expansion shell 81 seats in the hole.

From the above description of the prior art, it can be seen that there is considerable room for improvement in the area of blind fasteners. In particular, the drop-in anchors 50, 60 are undesirable because the pulling forces transferred to the respective sleeve 51, 61 from the threaded rod tend to loosen the anchor rather than further secure it. Because of this tendency to loosen under stress, the safe working load (SWL) of the prior art fasteners is generally low, mandating a larger than desirable number of anchors for a given application. All of the prior art fasteners require a threaded rod, making it difficult and time consuming to install and remove the rod. Finally, threaded rods are generally metallic to provide the shear strength needed at the threads and are therefore relatively expensive and subject to rust or corrosion that may damage the appearance or structural integrity of the resulting structure.

SUMMARY OF THE INVENTION

It is an object of the present invention to provide an anchoring device that is capable of securing a rod to an existing structure without having to use a threaded rod;

It is a further object of the present invention to provide an anchoring device that can secure a cylindrical rod against an existing structure for use as a form tie in a concrete form;

It is a further object of the present invention to provide an anchoring device that can securing deformed reinforcing bar against an existing structure; and It is a further object of the present invention to provide an anchoring device that achieves each of the objects yet which is cost effective to manufacture and easily installed;

The present invention is generally directed towards an improved anchoring device of the type that includes an expansion shell that may be inserted in an existing hole and through which a rod may be inserted, the improvement comprising means for gripping an unthreaded rod inserted through said expansion shell and means for expanding said expansion shell against the interior of said existing hole.

More specifically, a blind anchor according to the present invention is comprised of a hollow expansion sleeve including a cylindrical tapered interior, the exterior of said hollow expansion sleeve being closely dimensioned to said aperture for insertion therein and a jaw cluster comprised of a plurality of tapering jaw members that are pivotally secured at one end, said jaw members defining a variable size aperture and a frustoconical exterior surface, whereby said rod may be inserted in said variable size aperture of said jaw cluster and said hollow expansion sleeve may be slid over the exterior surface of said jaw cluster.

The features of the present invention which are to be believed to novel are set forth with particularity in the appended claims. The present invention, both as to its organization and manner of operation, together with further objects and advantages thereof, maybe be best understood by referring to the following description in conjunction with the drawings.

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE DRAWINGS

FIGS. 3a-3c are a side view, a bottom view, a rear view, and a front view of a gripping member of which the preferred anchoring device is comprised;

FIG. 4 is a plan view of a retaining ring for pivotally retaining a plurality of gripping members to form a jaw cluster;

FIG. 5 is a perspective view of a partially assembled jaw cluster comprised of three gripping members as shown in FIGS. 3a-3c that have been assembled in the notches of a retaining ring as shown in FIG. 4;

DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved blind anchor.

The construction industry has historically employed threaded metallic rods as form ties and when working with blind anchors. Recently however, the industry has begun to use unthreaded fiberglass rods as form ties in ordinary "two-wall" or "free-standing" concrete forms. However, smooth fiberglass rods have not yet been practical when constructing concrete forms adjacent to existing structures because, prior to the present invention, there was apparently no known blind fastener that operates satisfactorily with smooth or unthreaded fiberglass rods. Smooth, as used herein, shall mean unthreaded.

Figure 1:
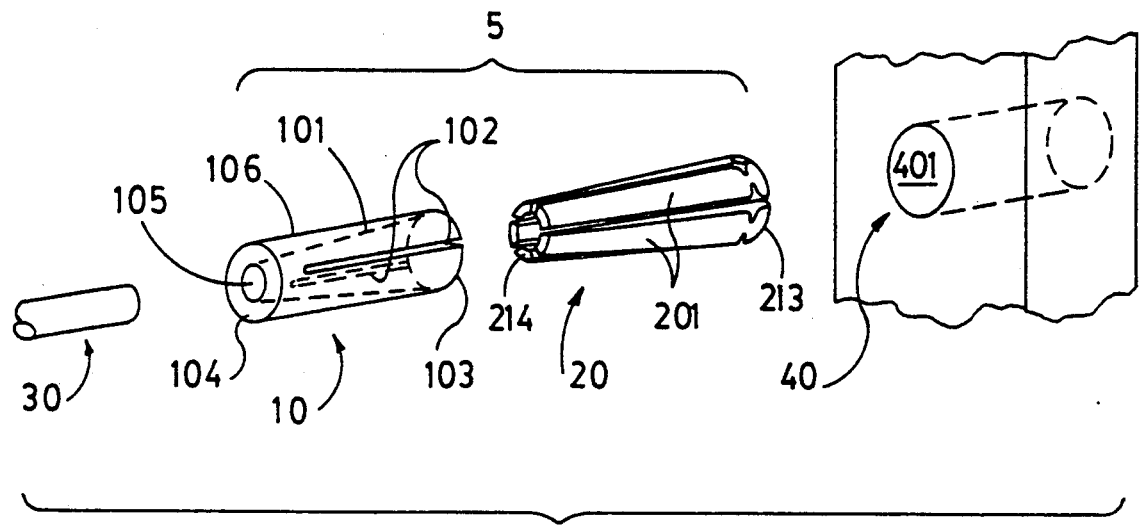
FIG. 1 is an exploded view of a preferred anchoring device according to the present invention.

Referring to FIG. 1, an exploded view of a smooth rod blind fastener 5 according to the present invention is shown to have two major components: an external expansion sleeve 10 and a jaw cluster 20. The blind fastener 5 is used to firmly anchor the smooth rod 30 into a hole 401 carried by an existing structure 40 as described further herein.

The external expansion sleeve 10 is comprised of an elongated cylindrical member 106 having an elongated aperture 105 extending therethrough from a back end 103 to a front end 104. The elongated aperture 105 tapers along line 101 from the back end 103 towards the front end 104. In the preferred embodiment, a pair of expansion slots 102 are cut or formed in the wall of the elongated cylindrical member. The expansion slots extend from the back end 103 and partially along the length of the elongated cylindrical member 106.

The jaw cluster 20, as shown in FIGS. 1 and 5, is comprised of a plurality of wedges or jaw members 201 that are pivotally held adjacent to one another with a notched retaining ring 210. The jaw cluster tapers cylindrically from its back end 213 towards its front end 214 such that the jaw cluster 20 may be inserted into the cylindrically tapered aperture 105 of the external expansion sleeve 10.

FIGS. 3a-3d illustrate the construction of the individual jaw members 201. Each jaw member 201 is comprised of a shank portion 208, a neck 206, and a retaining hub 207. Each shank portion 208 includes a rod contact surface 205 and a sleeve contact surface 204.

The retaining ring 210 is comprised of an substantially flat annular ring having a plurality of notches 211 and an aperture 212 sized to receive the smooth rod 30. As shown in FIG. 5, the jaw members 201 are installed around the retaining ring 210 by placing the neck 206 of each jaw member 201 into one of the notches 211 on the retaining ring 210. The jaw members 201 may be retained in the notches 211 of the retaining ring 210 with a coiled wire (not shown), or the like.

The shank portion 208 of each jaw member 201 includes a pair of beveled edges 202. As shown in FIGS. 1 and 5, when a plurality of the jaw members 201 are held adjacent to one another by the retaining ring 210, the adjoining beveled edges 202 provide the jaw cluster 201 with a roughly cylindrical shape. The adjacent rod contact surfaces 205 collectively define an internal elongated aperture (not separately numbered) for receiving the smooth rod 30. The collective sleeve contact surfaces 204, tapering relative to the rod contact surfaces 205, imparts a cylindrical taper to the exterior of the jaw cluster 20 so that is fits within the cylindrically tapered aperture 105 of the expansion sleeve 10.

In the preferred embodiment, the individual jaw members 201 include a slanted tip 203 to help guide the smooth rod 30 into the aperture defined between the plurality of jaw members 201 and a plurality of ridges 209 on the rod contact surface 205 for firmly gripping the smooth rod 30.

Figure 2:
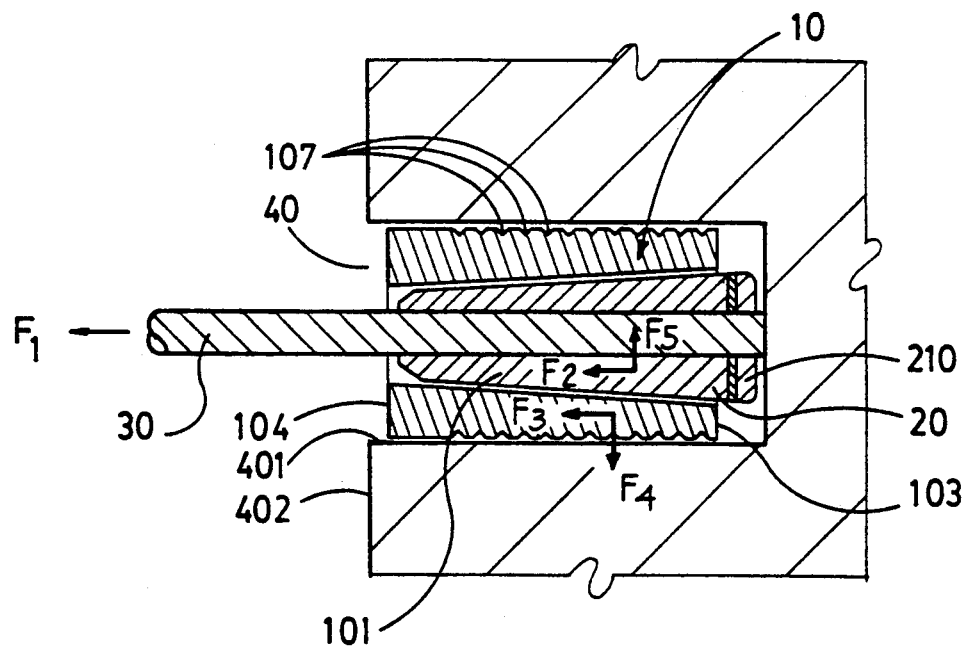
FIG. 2 is a cross-sectional view of the anchoring device of FIG. 1 after installation.
Figure 6:
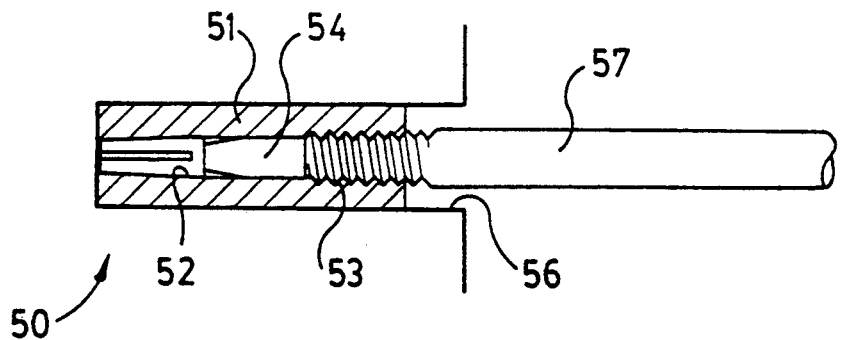
FIG. 6 is a sectional view of a known fastener called a drop-in anchor.
Figure 7:
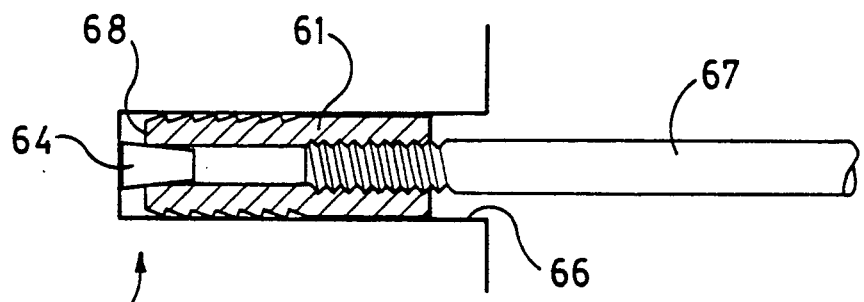
FIG. 7 is a sectional view of another known fastener that is a variation of the drop-in anchor shown in FIG. 6.
Figure 8:
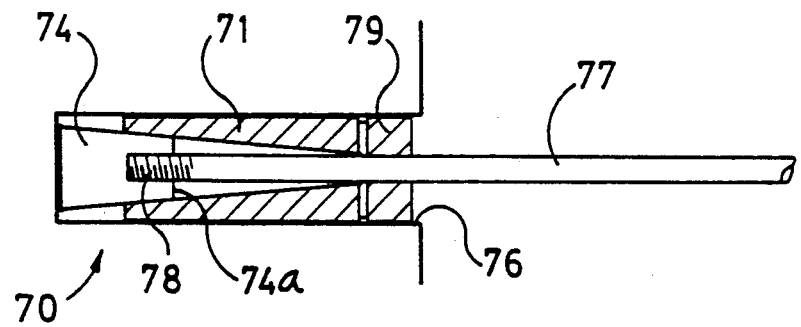
FIG. 8 is a sectional view of another fastener called a cone/sleeve blind fastener.
Figure 9:
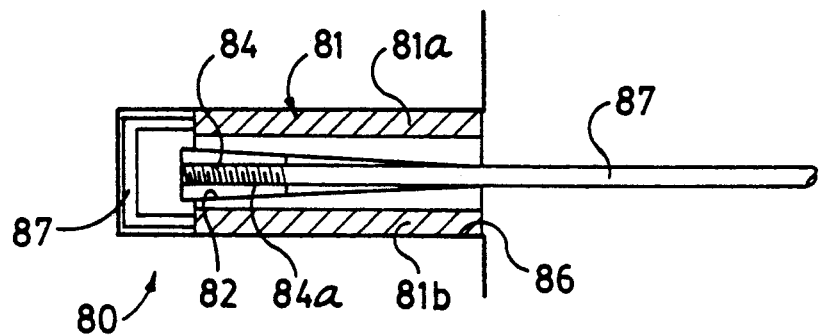
FIG. 9 is a sectional view of another known fastener sold under the trade name "Rock Anchor."

The blind anchor 5 is used to anchor a smooth in a pre-drilled hole 401 as follows:

(1) the smooth rod 30 is inserted through the tapering aperture 105 from the front end 104 of the expansion sleeve 10 and so that a few inches of the smooth rod 30 temporarily extend beyond the back side 103 of the expansion sleeve 10;

(2) the front end 214 of the jaw cluster 20 is slipped over the smooth rod 30 that extends beyond the expansion sleeve 10 and so that a small portion of the smooth rod 30 extends beyond the jaw cluster 20;

(3) the expansion sleeve is pushed down onto the jaw cluster 10 such that the jaw cluster 20 seats gently in the tapering aperture 105 of the expansion sleeve;

(4) the smooth rod 30, expansion sleeve 10, and jaw cluster 20 are then inserted into the pre-drilled hole 401 until the smooth rod 30 bottoms out;

(5) a weighted sleeve seating tool (not shown) is slid onto the exposed end of the smooth rod and used to hammer the expansion sleeve 10 down onto the jaw cluster 20 to the position shown in FIG. 2.

The reinforcing operation of the present invention is best understood with reference to FIG. 2 which shows the smooth rod 30 anchored in the hole 401. If smooth rod 30 experiences a pulling force $F_1$ (e.g. due to the placement of concrete), the force $F_1$ is transmitted to the jaw cluster 20 as force $F_2$. The force $F_2$ is then transmitted from the jaw cluster 20 to the expansion sleeve 10 as component forces $F_3$ and $F_4$ because of the tapering connection between these two components. The force $F_4$, being radially outward, serves to further expand the expansion sleeve 10 against the sides of the hole 401. Moreover, the radial forces that cause the jaw cluster 20 to grip the smooth rod 30 are increased because an inward radial force $F_5$, equal and opposite to the force $F_4$, is experienced by the jaw cluster 20.

Those skilled in the art will appreciate that various adaptations and modifications of the just-described preferred embodiment can be configured without departing from the scope and spirit of the invention. For example, jaw clusters having different number of jaw members or geometry may be used with similar results. It is therefore understood that, within the scope of the appended claims, the invention may be practiced other than as specifically described herein.

What is claimed is:

1. A device for blindly anchoring a smooth elongated rod of uniform diameter within a single-ended aperture comprising:

an elongated metallic expansion sleeve having a cylindrical exterior closely sized to fit into the single-ended aperture and having a cylindrical tapered interior extending axially from a first aperture at a back end of said sleeve and reducingly toward a reduced aperture located on a front end of said sleeve, said reduced aperture sufficiently sized to accommodate said smooth rod and to define a front end contact surface, said expansion sleeve further including a pair of diametrically opposed slots extending from said back end and partially along the length thereof toward said front end; and a jaw cluster comprising a plurality of elongated jaw members having exterior surfaces tapered from a larger back end for mating with the tapered interior of said expansion sleeve, and a substantially flat ring having notches about its perimeter for pivotally securing ends of the jaw members therein at the larger back end of said jaw members for defining a variable circumference interior aperture and a variable size frustoconical exterior surface along the length thereof, whereby said rod may be inserted through said reduced aperture of said sleeve and into said variable aperture of said jaw cluster, and whereby said expansion sleeve, said jaw cluster, and said rod may be inserted into said single-ended aperture and whereby the front end contact surface of said expansion sleeve may be pressed or hammered inward to force the cylindrical tapered interior of said cylindrical sleeve onto the frustoconical exterior surface of said jaw cluster and thus expanding the circumference of said expansion sleeve to exert a retaining force on the interior of said single-ended aperture while simultaneously decreasing the circumference of said interior aperture of said jaw cluster to apply a gripping force to an elongated portion of the circumference of said smooth rod retaining in said interior aperture.

2. The anchoring device of claim 1 wherein said expansion sleeve has a plurality of grooves extending around the periphery thereof.

3. A device in combination with a smooth elongated rod of uniform diameter and an existing structure for securely anchoring the smooth elongated rod of uniform diameter to the existing structure comprising:

an elongated single-ended aperture of a first diameter extending inward from a front opening in an exterior face of said existing structure to a bottom end;

the smooth elongated rod of uniform diameter having a front end and a back end;

a jaw cluster having a frustoconical exterior surface, said jaw cluster comprised of a plurality of elongated jaw members, each elongated jaw member tapering from a larger back end to a smaller front end, said jaw cluster further comprised of a means for pivotally securing the plurality of elongated jaw members to one another at the larger back end thereof and in a circular side-by-side arrangement to provide an elongated variable sized aperture between the plurality of elongated jaw members of said jaw cluster;

said smooth elongated rod surrounded by the elongated variable sized aperture o said jaw cluster with the larger back ends of the plurality of elongated jaw members surrounding said smooth elongated rod near the back end thereof and the smaller front ends of the plurality of elongated jaw members surrounding a forward portion of the smooth elongated rod;

a hollow expansion sleeve having a back end and a front end and having a cylindrical exterior of a second diameter sized to fit closely within the first diameter of said single-ended aperture, said hollow expansion sleeve having a tapering elongated cylindrical aperture tapering from a larger diameter aperture at the back end thereof to a smaller diameter aperture at the front end thereof, an annular contact face being defined at the front end of said hollow expansion sleeve between the smaller diameter aperture and the cylindrical exterior of said hollow expansion sleeve, said hollow expansion sleeve further having a pair of opposed elongated expansion slots for allowing ease of expansion, said expansion slots connecting the cylindrical exterior and the tapering elongated cylindrical aperture and extending from the back end and partially towards the front end;

said jaw cluster and said smooth elongated rod collectively surrounded by the tapering elongated cylindrical aperture of said hollow expansion sleeve with said smooth elongated rod and the smaller front ends of the plurality of elongated jaw members surrounded by the smaller diameter aperture of the tapering elongated cylindrical aperture and with the back end of said smooth elongated rod and the back ends of the plurality of elongated jaw members of said jaw cluster extending backward from the larger diameter aperture of the hollow expansion sleeve; and said hollow expansion sleeve, said jaw cluster, and said smooth elongated rod collectively surrounded by said single-ended aperture with the back end of said smooth elongated rod being bottomed out against the bottom end of said single-ended aperture whereby said hollow expansion sleeve may be forced down around said jaw cluster and said smooth elongated rod by hammering the annular contact face of said hollow expansion sleeve such that said hollow expansion sleeve is firmly wedged between said single-ended aperture and the frusto-conical exterior surface of said jaw cluster and such that said smooth elongated rod is firmly gripped by the elongated variable sized aperture of said jaw cluster.

4. The device of claim 3 wherein the cylindrical exterior of said hollow expansion sleeve has a plurality of annular grooves defined therein for more securely gripping said single-ended aperture.

5. The device of claim 3 wherein the smooth elongated rod is comprised of a composite material.

6. The device of claim 5 wherein the composite material is fiberglass.

* * * * *